(12) United States Patent
Gattere et al.

(10) Patent No.: US 12,474,368 B2
(45) Date of Patent: Nov. 18, 2025

(54) Z-AXIS MICROELECTROMECHANICAL SENSOR DEVICE WITH IMPROVED STRESS INSENSITIVITY

(71) Applicant: STMICROELECTRONICS S.R.L., Agrate Brianza (IT)

(72) Inventors: Gabriele Gattere, Castronno (IT); Francesco Rizzini, Passirano (IT); Cristian Dall'Oglio, Niscemi (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 18/055,804

(22) Filed: Nov. 15, 2022

(65) Prior Publication Data

US 2023/0160921 A1 May 25, 2023

(30) Foreign Application Priority Data

Nov. 25, 2021 (IT) .......................... 102021000029810

(51) Int. Cl.
| | | |
|---|---|---|
| G01P 15/125 | (2006.01) | |
| G01P 15/08 | (2006.01) | |
| G01P 15/18 | (2013.01) | |

(52) U.S. Cl.
CPC .......... *G01P 15/18* (2013.01); *G01P 15/0802* (2013.01); *G01P 15/125* (2013.01)

(58) Field of Classification Search
CPC ............................................... G01P 2015/0837
See application file for complete search history.

(56) References Cited

U.S. PATENT DOCUMENTS

| | | | |
|---|---|---|---|
| 5,249,465 A | 10/1993 | Bennett et al. | |
| 7,121,141 B2 | 10/2006 | McNeil | |
| 8,640,543 B2 * | 2/2014 | Lee ..................... | B81C 1/00246 73/514.32 |
| 2010/0107762 A1 * | 5/2010 | Classen ............... | G01P 15/0802 29/829 |
| 2010/0175473 A1 | 7/2010 | Classen | |
| 2011/0023604 A1 | 2/2011 | Cazzaniga et al. | |

(Continued)

FOREIGN PATENT DOCUMENTS

| | | |
|---|---|---|
| CN | 102602875 A | 7/2012 |
| CN | 110824196 A | 2/2020 |

(Continued)

*Primary Examiner* — Stephen D Meier
*Assistant Examiner* — Ruben C Parco, Jr.
(74) *Attorney, Agent, or Firm* — Seed Intellectual Property Law Group LLP

(57) ABSTRACT

A microelectromechanical sensor device has a detection structure, having: a substrate, with a top surface; an inertial mass, suspended above the top surface of the substrate and elastically coupled to a rotor anchor so as to perform an inertial movement relative to the substrate as a function of a quantity to be detected; and stator electrodes, integrally coupled to the substrate at respective stator anchors and capacitively coupled to the inertial mass so as to generate a differential capacitive variation in response to, and indicative of, the quantity to be detected. In particular, the inertial mass performs, as the inertial movement, a translation movement along a vertical axis orthogonal to the top surface of the substrate; and the stator electrodes are arranged in a suspended manner above the top surface of the substrate.

13 Claims, 5 Drawing Sheets

(56) References Cited

U.S. PATENT DOCUMENTS

| | | | |
|---|---|---|---|
| 2014/0007685 A1* | 1/2014 | Zhang | G01P 15/0802 |
| | | | 73/514.32 |
| 2015/0192603 A1* | 7/2015 | Baldasarre | G01P 15/125 |
| | | | 73/514.32 |
| 2016/0091524 A1* | 3/2016 | Kamada | G01P 15/125 |
| | | | 73/514.32 |
| 2016/0169931 A1* | 6/2016 | Tocchio | G01P 15/02 |
| | | | 73/514.01 |
| 2017/0356929 A1 | 12/2017 | Zheng | |
| 2018/0231579 A1* | 8/2018 | Geisberger | G01P 15/125 |
| 2018/0245920 A1 | 8/2018 | Laghi et al. | |
| 2020/0158751 A1 | 5/2020 | Malvern | |
| 2021/0363000 A1 | 11/2021 | Allegato et al. | |
| 2022/0041429 A1 | 2/2022 | Rizzini et al. | |
| 2022/0050124 A1* | 2/2022 | Li | G01P 15/125 |

FOREIGN PATENT DOCUMENTS

| | | | | |
|---|---|---|---|---|
| DE | 102019200843 A1 | * | 7/2020 | |
| IT | 102020000011755 | * | 6/2022 | |
| WO | WO-2010032821 A1 | * | 3/2010 | B81B 7/007 |

\* cited by examiner

Z-AXIS MICROELECTROMECHANICAL SENSOR DEVICE WITH IMPROVED STRESS INSENSITIVITY

BACKGROUND

Technical Field

The present disclosure relates to a vertical-axis (so-called z-axis) MEMS (Micro-Electro-Mechanical System) sensor device, having an improved insensitivity to external stresses or stimuli that constitute a disturbance with respect to a quantity to be detected; the following discussion will make explicit reference, without this implying any loss of generality, to a MEMS sensor device implementing an accelerometer of a capacitive type, configured to detect a linear acceleration along the aforesaid z-axis.

Description of the Related Art

In general, the detection structure of a MEMS accelerometer comprises at least one inertial mass, customarily defined as "rotor mass" or simply "rotor" in so far as it is mobile by the inertial effect in the presence of an acceleration to be detected (without this implying, however, for the same inertial mass to necessarily have a rotary movement).

The inertial mass is arranged suspended above a substrate, coupled to a corresponding rotor anchor (fixed to the same substrate) by means of elastic elements, which allow movement of the same inertial mass by the inertial effect.

The detection structure of the MEMS accelerometer further comprises stator electrodes, which are fixed and integrally coupled to the substrate and are capacitively coupled to the rotor to form one or more detection capacitors (typically in differential configuration), whose capacitive variation is indicative of the quantity to be detected.

Typically, the MEMS accelerometer further comprises an electronic reading circuit, the so-called ASIC (Application Specific Integrated Circuit), electrically coupled to the detection structure, which receives at its input the capacitive variation produced by the detection capacitor and processes it so as to determine the value of acceleration, to generate an electrical output signal (which can be supplied at the output from the MEMS accelerometer for subsequent processing operations).

The aforesaid ASIC electronic reading circuit and the detection structure are typically made in respective dies of semiconductor material, which are housed within a container, the so-called package, which encloses and protects the same dies, moreover providing an electrical connection interface towards the outside; in so-called substrate-level-package solutions, the package is formed from one or more base and cap layers, which are directly coupled to the dies of the MEMS device to constitute the mechanical and electrical interface towards external devices.

FIGS. 1A and 1B show, in a top view and, respectively, in a cross-sectional view a detection structure of a known type, designated as a whole by 1, of a vertical-axis MEMS accelerometer.

The detection structure 1 comprises an inertial mass 2 having a main extension in a horizontal plane xy (in the example, having a generically rectangular shape, elongated along a first horizontal axis x), arranged suspended above a substrate 3, having a top surface 3a.

The inertial mass 2 has internally a window 4 that divides it into a first and a second portion 2a, 2b with asymmetrical mass distribution, in the example the first portion 2a having an extension along the first horizontal x-axis greater than a corresponding extension of the second portion 2b.

The inertial mass 2 is elastically coupled to a rotor anchor 5, arranged centrally with respect to the window 4, by means of a first and a second torsional elastic element 6a, 6b, which have a linear extension along a second horizontal axis y of the aforesaid horizontal plane xy.

The first and second torsional elastic elements 6a, 6b define a rotation axis A for the inertial mass 2, which moves by the inertial effect in the presence of an external acceleration acting along the z-axis, orthogonal to the aforesaid horizontal plane xy, with rocking or "swinging" movement about the aforesaid rotation axis A.

The detection structure 1 further comprises a first and a second stator electrode 8a, 8b arranged on the substrate 3, fixedly coupled to its top surface 3a, underneath the inertial mass 2, on opposite sides with respect to the window 4.

In particular, the first stator electrode 8a is arranged below the first portion 2a, whereas the second stator electrode 8b is arranged below the second portion 2b of the inertial mass 2, to form a pair of detection capacitors.

The aforesaid rotation by the inertial effect of the inertial mass 2 about the rotation axis A therefore determines the approach/moving away of the inertial mass 2 with respect to the first stator electrode 8a and a corresponding moving away/approach of the same inertial mass 2 with respect to the second stator electrode 8b, thereby causing a differential capacitive variation of the aforesaid detecting capacitors, which is indicative of the extent of the external acceleration.

The detection structure 1 described previously may be subject to measurement errors in the case stress and deformations occur, in particular induced in the corresponding detection structure 1 as a result of the interaction with the package, for example, as the temperature or environmental conditions vary or on account of mechanical stresses.

The package of a microelectromechanical sensor is in fact subjected to deformations as the temperature varies, due to the different coefficients of thermal expansion and to the different values of Young's modulus of the different constituent materials; this may cause corresponding deformations in the substrate of the detection structure house inside the same package. Similar deformations may occur on account of ageing of the materials, or of particular stresses induced from outside, for example, due to soldering of the package on a printed circuit, or absorption of humidity by the materials constituting the package.

As illustrated schematically in FIG. 2, in the presence of deformations of the substrate 3, for example due to a thermal stress, such as cooling, a curvature or depression of the top surface 3a of the substrate 3 may occur (FIG. 2 shows this deformation in an accentuated manner, for reasons of clarity of illustration), which may lead to the stator electrodes 8a, 8b approaching the inertial mass 2, in the initial resting condition, in the absence of external acceleration.

In particular, in the aforesaid FIG. 1B the theoretical distance at rest in the absence of deformations is designated by go, and in FIG. 2 $x_{1,\Delta T}$ and $x_{2,\Delta T}$ are the displacements with respect to the condition at rest due to the deformation of the substrate 3 (these displacements are variable as a function of temperature or, in general, of all those external effects that are capable of inducing deformations of the same substrate 3).

The aforesaid displacements lead to the following variations in the values of the detection capacitances, designated by $C_1$ and $C_2$ (variations which are undesired in so far as they are not linked to the acceleration to be detected):

$$C_{1,\Delta T} = \frac{\varepsilon_0 \cdot A}{g_0 - x_{1,\Delta T}}; \text{ and}$$

$$C_{2,\Delta T} = \frac{\varepsilon_0 \cdot A}{g_0 - x_{2,\Delta T}}.$$

Similarly, in a way not illustrated, heating ($\Delta T > 0$) leads, on account of swelling of the top surface 3a of the substrate 3, to the following undesired variations of the values of the detection capacitances $C_1$, $C_2$, on account, this time, of a moving of the stator electrodes 8a, 8b away from the inertial mass 2 in the initial resting condition:

$$C_{1,\Delta T} = \frac{\varepsilon_0 \cdot A}{g_0 + x_{1,\Delta T}}; \text{ and}$$

$$C_{2,\Delta T} = \frac{\varepsilon_0 \cdot A}{g_0 + x_{2,\Delta T}}.$$

These capacitive variations cause an undesired modification (the so-called drift or offset) of the output signal at rest provided by the MEMS accelerometer, referred to as "zero-g level," and a consequent error in acceleration detection.

To overcome this drawback a wide range of solutions have been proposed, which are not, however, altogether satisfactory.

In particular, some solutions envisage optimization of the acceleration-detection structure.

For example, US 2011/0023604 discloses a detection structure of a MEMS accelerometer, where positioning of the rotor anchors with respect to the position of the stator electrodes (which are arranged on the top surface of the substrate) is optimized in order to reduce the variations of the electrical parameters due to the deformations of the substrate. In particular, the rotor and stator anchors are arranged in strict mutual proximity, i.e., as close as possible to one another compatibly with the manufacturing process.

In this solution, although being advantageous, there are physical limits (linked to the dimensions of the anchorages) and moreover technical limits (linked to the manufacturing technique) that do not enable effective elimination of the drift errors in the output signal provided by the MEMS accelerometer (in fact, there is in any case a certain distance, albeit minimized compatibly with the manufacturing process, between the anchor positions).

Other solutions envisage an optimization at the package level; for example, it has been proposed to use ceramic substrates having a reduced sensitivity to deformations.

However, these solutions entail greater difficulties in the manufacturing process and in general higher costs; furthermore, the dimensions of the ceramic packages are generally greater than those of traditional packages of plastic material.

BRIEF SUMMARY

The present disclosure is directed to solving the above discussed problems, and in particular to provide a microelectromechanical sensor device, having improved stability and reduced drift of its electrical characteristics with respect to external stimuli, such as thermal variations, or mechanical or environmental stresses, or other external stimuli of various nature.

The present disclosure is directed to a device that includes a substrate having a first surface. An anchor is coupled to the substrate. An inertial mass is suspended above the first surface of the substrate and elastically coupled to the anchor. A first stator electrode is coupled to the substrate, the first stator electrode having a second surface that is spaced from the first surface of the substrate by a first distance, the second surface facing away from the substrate. A second stator electrode coupled to the substrate and spaced from the first stator electrode by the anchor, the second stator electrode having a third surface that is spaced from the first surface of the substrate by a second distance that is less than the first distance, the third surface facing away from the substrate.

BRIEF DESCRIPTION OF THE SEVERAL VIEWS OF THE DRAWINGS

For a better understanding of the present disclosure, preferred embodiments thereof are now described purely by way of non-limiting example and with reference to the attached drawings, wherein.

DETAILED DESCRIPTION

Figure 1A:
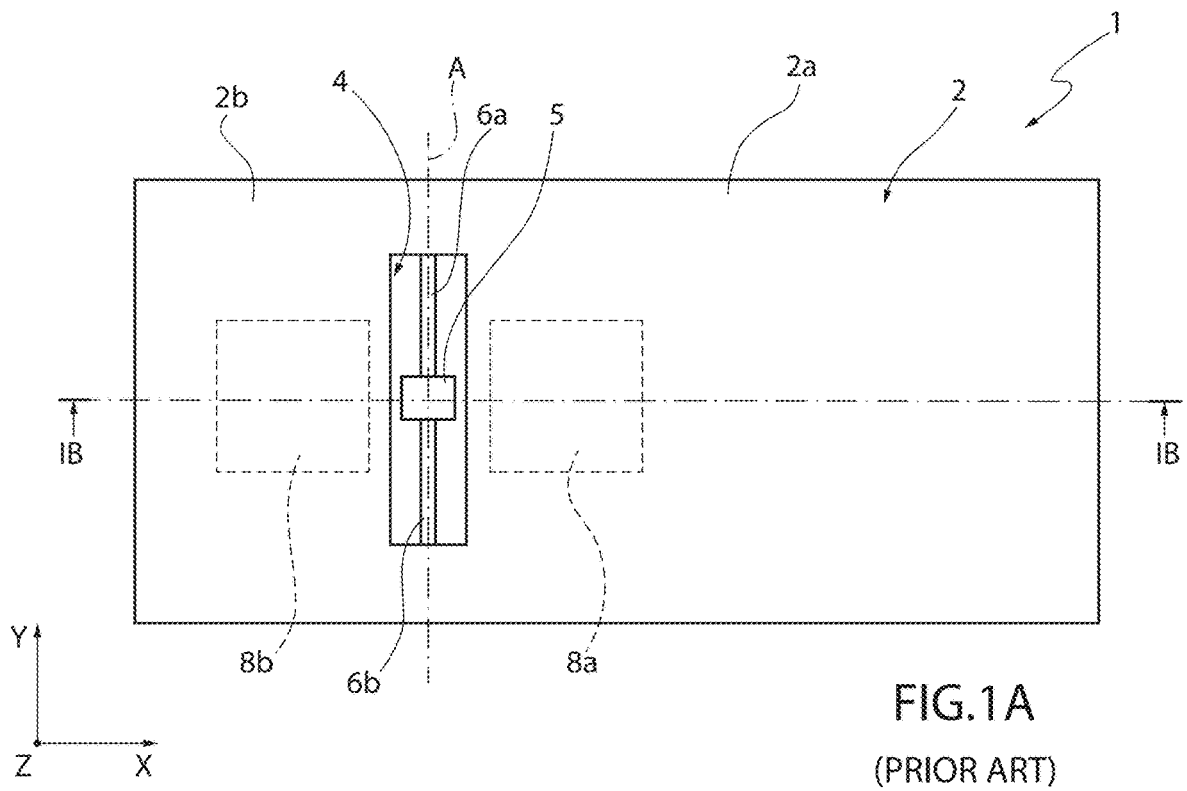
FIGS. 1A and 1B are, respectively, a top view and a schematic cross-sectional view of a detection structure of a vertical-axis MEMS accelerometer, of a known type.
Figure 1B:
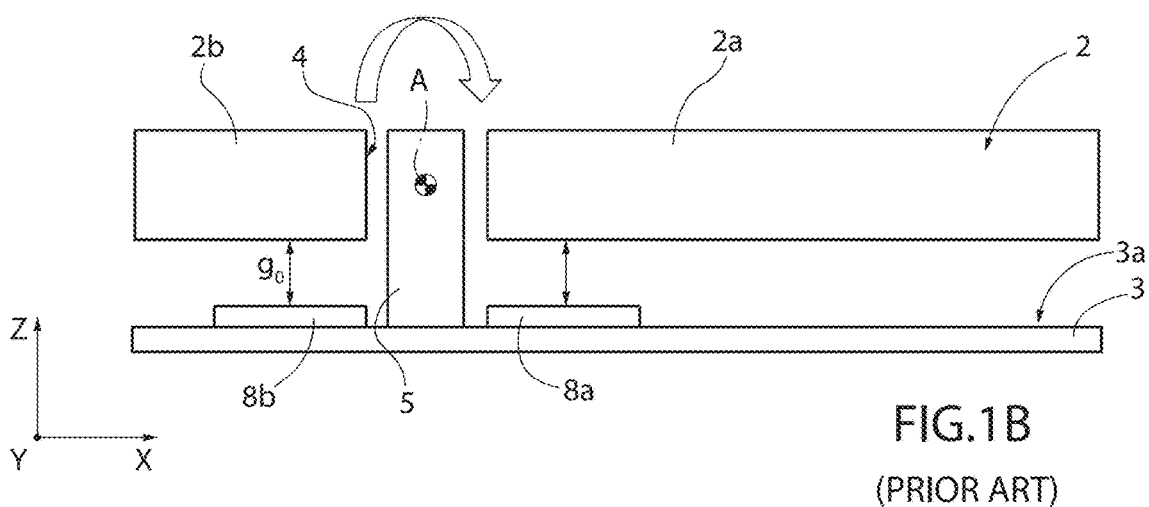
Figure 2:
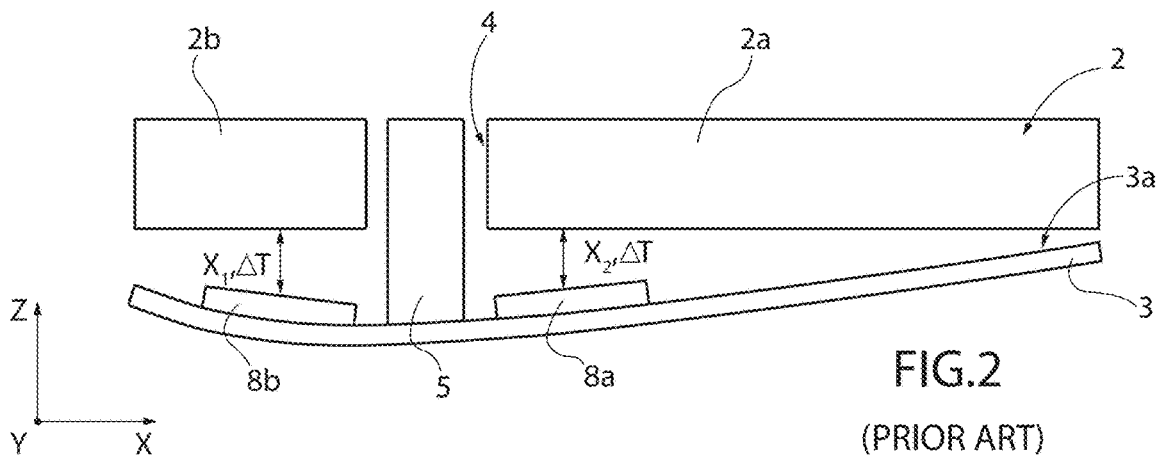
FIG. 2 is a schematic representation of the detection structure of FIG. 1B in the presence of a deformation of a corresponding substrate.

As will be discussed in detail below, an aspect of the present solution envisages a detection structure of a MEMS sensor device (in particular, a vertical z-axis accelerometer), in which the stator electrodes are arranged in a fully suspended manner with respect to an underlying substrate and in a differential way with respect to the inertial mass to which they are capacitively coupled (i.e., a first stator electrode being arranged below the inertial mass and a second stator electrode being arranged above the same inertial mass). The inertial mass is in this case elastically coupled to the substrate so as to perform a translation movement along the vertical axis by the inertial effect in the presence of an external acceleration acting along the same vertical axis.

As will be discussed in detail, in this way any possible deformations induced by the package in the substrate do not substantially entail any modification of the relative distance between the stator electrodes and the inertial mass in the resting condition, rendering detection, in fact, insensitive to the deformations, thus preventing any possible modifications of the output signal at rest supplied by the MEMS accelerometer (eliminating the aforesaid drift of the zero-g level).

In particular, according to an aspect of the present solution, the detection structure comprises two overlying structural layers of semiconductor material (in particular epitaxial silicon), which are independent and are appropriately machined (for example, by trench etching and removal of sacrificial layers) to define the structural elements of the detection structure (in particular, the aforesaid stator electrodes and the aforesaid inertial mass).

As will be described in detail below, a first stator electrode is defined in a first structural layer, and a second stator electrode is defined in a second structural layer, with the inertial mass that is obtained by exploiting both structural layers so that it faces, at a certain distance of separation, both of the stator electrodes, being above or below the same stator electrodes in a vertical direction (with differential configuration).

Formation of the detection structure through the aforesaid stacked structural layers may, for example, be carried out using the manufacturing process described in detail in the Italian patent application 102020000011755 filed in the name of the present Applicant on 20 May 2020.

In brief, this process envisages growth, on a substrate consisting, for example, of monocrystalline silicon, of a first thick epitaxial layer, overlying a first sacrificial layer of dielectric material, which is then in part removed by etching (for example, using hydrofluoric-acid vapors). The first sacrificial layer has openings, at which regions of anchorage to the substrate for the aforesaid first epitaxial layer are defined.

The first epitaxial layer constitutes a first structural layer, in which first trenches are formed, for example with dry silicon etching; the first trenches are empty, or subsequently filled with dielectric material, and define structural elements of the detection structure or a bottom part (i.e., closer to the substrate) of the same structural elements; conductive regions (defining pads and electrical interconnections) are formed underneath the first sacrificial layer, at the regions of anchorage to the substrate of the aforesaid first epitaxial layer and separated from a top surface of the substrate by a dielectric layer in order to enable electrical biasing of the aforesaid structural elements.

Next, the manufacturing process envisages the formation of a second sacrificial layer of dielectric material on the first epitaxial layer, and the definition of the same second sacrificial layer for formation of sacrificial regions separated from one another by openings.

A second epitaxial layer, which has a smaller thickness than (for example, equal to half of) the first epitaxial layer, is then formed on the first epitaxial layer and on the sacrificial regions; the second epitaxial layer is in direct contact with the first epitaxial layer at the aforesaid openings and constitutes a second structural layer, in which, by formation of second trenches, structural elements of the detection structure or a top part (i.e., further away from the substrate) of the same structural elements are defined.

The process then envisages removal, either partial or complete, of the sacrificial regions, once again through etching (for example, using hydrofluoric-acid vapors) so as to release the structural elements of the detection structure, both at the higher level and at the lower level.

It should be noted that, following upon etching, structures of the second epitaxial layer may be in direct (mechanical and electrical) contact with underlying structures of the first epitaxial layer, or be separated by an empty region (gap) from the underlying first epitaxial layer so as to be suspended above the same first epitaxial layer. Furthermore, both of the structures, which are obtained starting from the first or the second epitaxial layers, may be formed suspended above the substrate.

The process typically further comprises final steps including coupling of a cap through a bonding layer (for example, of glass frit) on top of the stack of the first and second structural layers of the detection structure. This cap has a sealing function (possibly hermetic sealing), as well as the purpose of protecting the detection structure from the external environment (from humidity, dust, etc.), as well as from impacts.

Figure 3A:
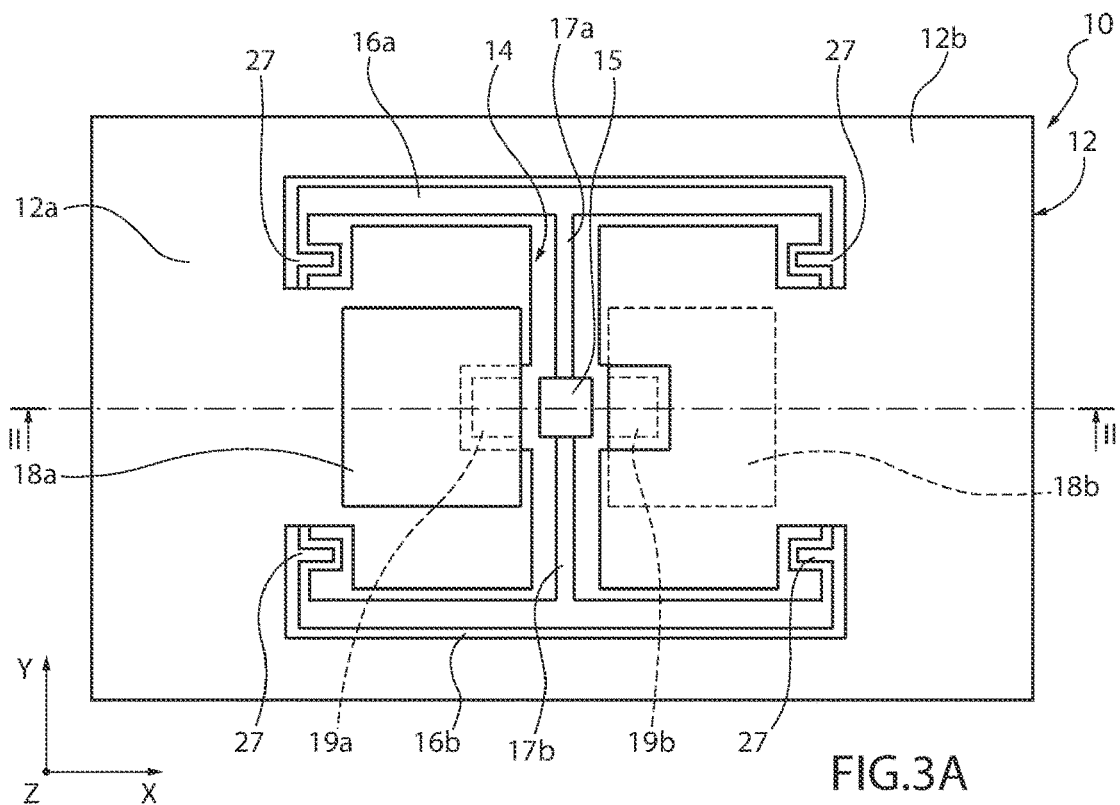
FIGS. 3A and 3B are, respectively, a top view and a schematic cross-sectional view along line II-II of a detection structure of a vertical-axis MEMS accelerometer according to a first embodiment of the present solution.
Figure 3B:
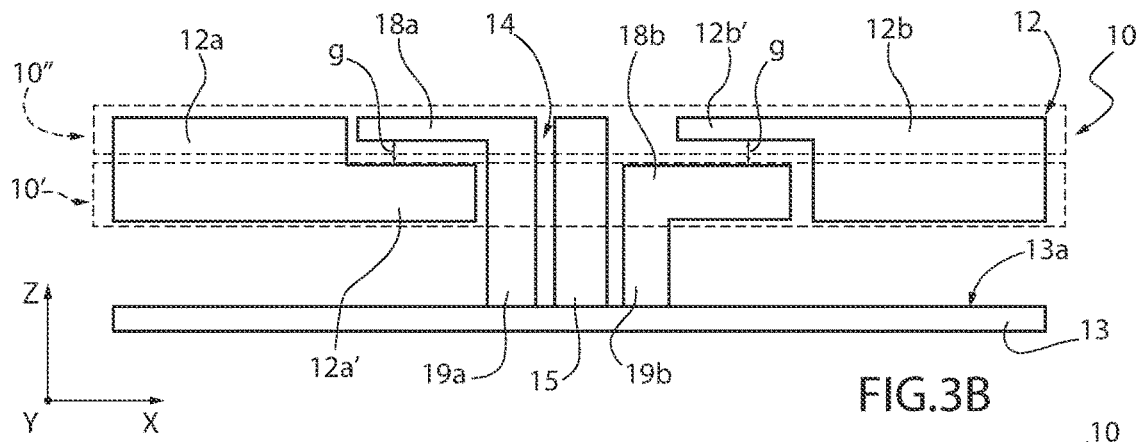

With reference to the top view of FIG. 3A and to the cross-sectional view of FIG. 3B, a first embodiment of the present solution, regarding a detection structure of a vertical-axis MEMS accelerometer, is now described.

The detection structure, designated by 10, comprises an inertial mass 12, which has a main extension in a horizontal plane xy and has, in the example, a generically rectangular shape in plan view with major side along a first horizontal x-axis.

The inertial mass 12 is suspended above a substrate 13 of semiconductor material, in particular silicon, and is elastically coupled to a rotor anchor 15, which is arranged at the center of a window 14, provided inside the same inertial mass 12, and is constituted by a column or pillar structure integral with respect to the same substrate 13. The plane of main extension of the inertial mass 12 is substantially parallel to a top surface 13a of the aforesaid substrate 13.

In particular, the inertial mass 12 is coupled to the rotor anchor 15 by a first and a second elastic element 16a, 16b, which, by their torsional and flexural deformation, enable translation of the same inertial mass 12 along the vertical axis z by the inertial effect in the presence of an external acceleration acting along the same vertical axis z (these elastic elements 16a, 16b being therefore compliant to torsion and bending along the vertical z-axis and rigid with respect to other translation movements in the horizontal plane xy or to rotation).

The aforesaid first and second elastic elements 16a, 16b have, in this case, a linear extension along the first horizontal axis x and are arranged on opposite sides of the rotor anchor 15 with respect to the second horizontal axis y. In particular, the first and the second elastic elements 16a, 16b are coupled to the aforesaid rotor anchor 15 by, respectively, a first and a second connection element 17a, 17b, having a linear extension along the second horizontal axis y.

The first and second elastic elements 16a, 16b are also connected to the inertial mass 12 by further connection elements 27, having a general extension along the second horizontal axis y and moreover having an uncoupling elastic portion 27' for elastic uncoupling with respect to the inertial mass 12.

In this embodiment, the inertial mass 12 is divided by the window 14 into a first and a second half 12a, 12b, with substantially symmetrical distribution of mass with respect to the central anchorage 15.

The detection structure 12 further comprises a first and a second stator electrode 18a, 18b, which are arranged, in this case, suspended above the substrate 13, to which they are integrally coupled by a first and, respectively, a second stator anchor 19a, 19b, constituted by a column or pillar structure integral to the substrate; in particular, the stator electrodes 18a, 18b are suspended in cantilever fashion from the respective stator anchor 19a, 19b.

In this embodiment, the first and the second stator electrodes 18a, 18b have a substantially rectangular shape in plan view, elongated along the second horizontal axis y.

Moreover, the first and the second stator anchors 19a, 19b are substantially aligned to the rotor anchor 15 along the first horizontal axis x and are arranged in strict proximity to one another, at a mutual short distance apart along the same first horizontal axis x (for example, at a minimum distance allowed by the manufacturing process).

In particular, the aforesaid first and second stator electrodes 18a, 18b are arranged facing the first, respectively the second, halves 12a, 12b, of the inertial mass 12, on opposite sides with respect to the vertical axis z. In the embodiment illustrated, the first stator electrode 18a is arranged above a reduced thickness portion 12a' of the first half 12a of the inertial mass 12, whereas the second stator electrode 18b is arranged below a respective reduced thickness portion 12b' of the second half 12b of the inertial mass 12.

In greater detail, in this embodiment, the first stator electrode 18a is provided in a second structural layer 10" of the detection structure 10 arranged at a higher level, at a greater distance from the top surface 13a of the substrate 13, with the facing reduced thickness portion 12a' of the inertial mass 12 provided in a first structural layer 10' of the same detection structure 10, arranged at a lower level, i.e., at a shorter distance from the top surface 13a of the substrate 13 along the vertical axis z (it should be noted that, in the manufacturing process, the second structural layer 10" is formed after the first structural layer 10', as it has been discussed previously with reference to the process described in patent application Ser. No. 10/202,0000011755).

Accordingly, the second stator electrode 18b is provided in the first structural layer 10' of the detection structure 10, with the respective facing reduced thickness portion 12b' of the inertial mass 12 formed in the second structural layer 10".

In particular, the first and the second structural layers 10', 10" are epitaxial-silicon layers grown on the top surface 13a of the substrate 13, at least partially electrically and/or mechanically uncoupled from one another, as discussed previously with reference to the teachings of the aforesaid Italian patent application 102020000011755.

In this embodiment, the second stator electrode 18b has, for example, a thickness along the vertical axis z that is greater than the thickness of the first stator electrode 18a, and the reduced thickness portion 12a' has a thickness greater than the reduced thickness portion 12b' of the inertial mass 12 (the thickness of the first structural layer 10' being greater than the thickness of the second structural layer 10"). There may, however, be envisaged a solution in which the thicknesses of the first and the second structural layers 10', 10" are substantially the same.

At rest, the facing distance or gap, designated by g, between the first and the second stator electrodes 18a, 18b and the respective reduced thickness portion 12a', 12b' of the inertial mass 12 substantially correspond.

Consequently, in this embodiment, the detection structure 10 is substantially symmetrical with respect to the first and the second horizontal axes x, y; likewise, the rotor anchor 15 defines a center of symmetry for the configuration of the same detection structure 10.

In this embodiment, in a way not illustrated here, the aforesaid first and second elastic elements 16a, 16b are also formed in the second structural layer 10" of the detection structure 10, therefore having, for example, a thickness smaller than that of the inertial mass 12, as well as a width smaller than that of their longitudinal extension.

In the presence of an external acceleration acting along the vertical axis z, the inertial mass 12 translates upwards or downwards causing a relative displacement of a differential type with respect to the first and the second stator electrodes 18a, 18b and a corresponding differential capacitive variation, indicative of the value of the same external acceleration.

Advantageously, the detection structure 10 described is substantially insensitive to the deformations of the package and of the substrate 13 deriving from external stresses.

Figure 4:
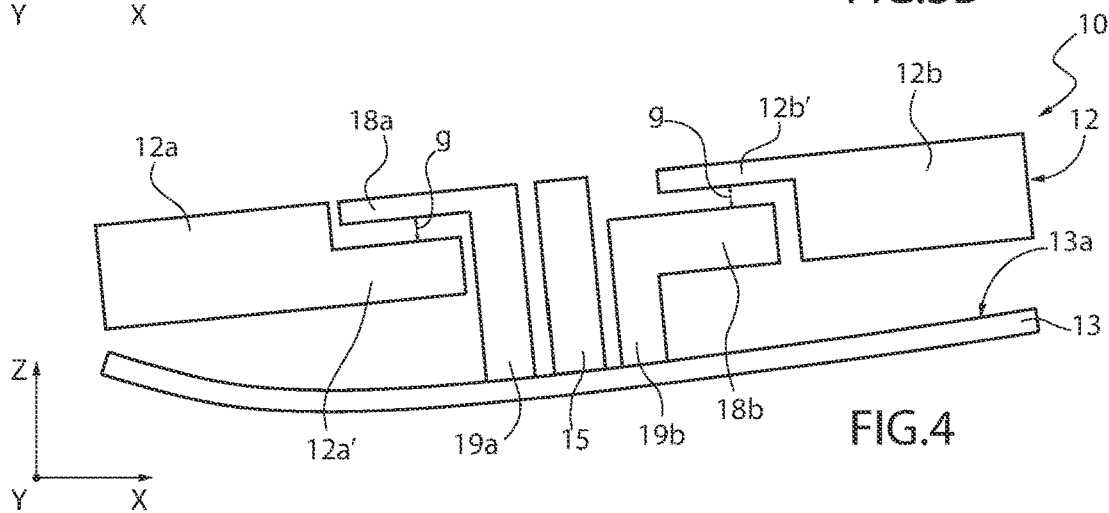
FIG. 4 is a schematic representation of the detection structure of FIG. 3B in the presence of a deformation of a corresponding substrate.

As illustrated schematically in FIG. 4, in fact, a deformation of the substrate 13, for example a curvature due to a thermal stress caused by cooling ($\Delta T<0$), in this case affects in a similar manner both the inertial mass 12 and the stator electrodes 18a, 18b, given the proximity of the anchors and the corresponding fully suspended configuration with respect to the substrate 13. Consequently, substantially no relative movement between the inertial mass 12 and the stator electrodes 18a, 18b occurs, in the resting condition, in the absence of external acceleration (in other words, there is no variation of the separation distance at rest, or gap go).

Advantageously, no undesired modification of the output signal at rest supplied by the MEMS accelerometer therefore occurs, with basically no drift or change of the "zero-g level."

The solution described moreover has further advantages.

In the first place, unlike traditional solutions with rocking see-saw movement of the inertial mass, where only the part of unbalanced mass contributes to the movement by the inertial effect, in this case the entire footprint of the inertial mass 12, which translates along the vertical axis z, actively contributes to the movement due to the inertia.

Moreover, the full-scale range does not depend, in this case, on the size of the electrodes; in particular, as the size of the stator electrodes 18a, 18b varies, both the full-scale value and the stability remain substantially unvaried. Instead, in the aforesaid traditional solution with rotation movement of the inertial mass, an increase in the size of the stator electrodes leads to a reduction of the full-scale value and of the stability.

The solution described proves moreover to have, once again thanks to the translating configuration of the inertial mass 12, positive and negative full-scale ranges that are altogether symmetrical with respect to external accelerations acting upwards or downwards along the vertical axis z, also in this case unlike the aforesaid traditional solution.

Furthermore, the detection structure 10 is less affected by parasitic capacitances and therefore is more insensitive to noise thanks to the suspended configuration of the stator and rotor electrodes, which are far from the substrate 13 and separated from adjacent elements by an air gap (or in general by a gap filled of residual gas resulting from the packaging operations).

Figure 5A:
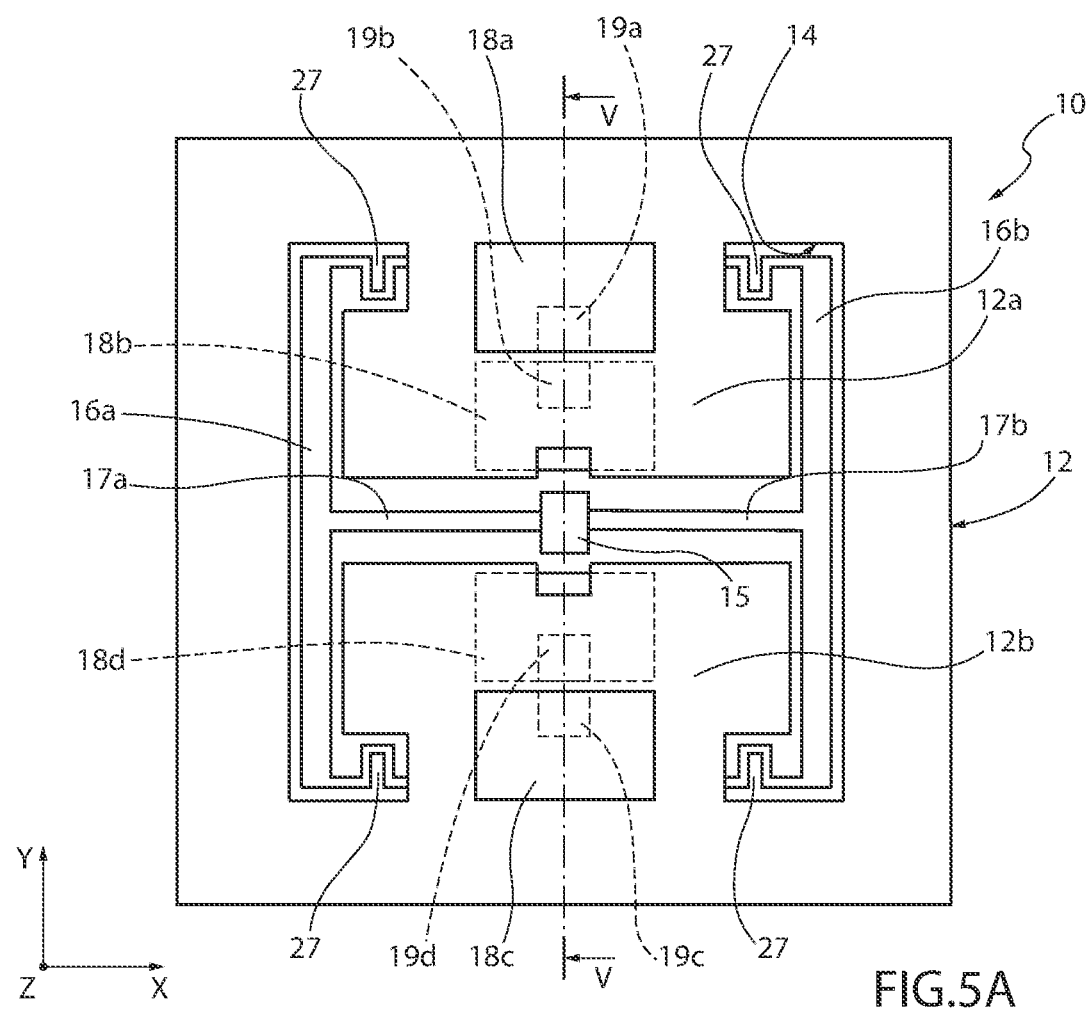
FIGS. 5A and 5B are, respectively, a top view and a schematic cross-sectional view along line V-V of a detection structure of a vertical-axis MEMS accelerometer, according to a further embodiment of the present solution.
Figure 5B:
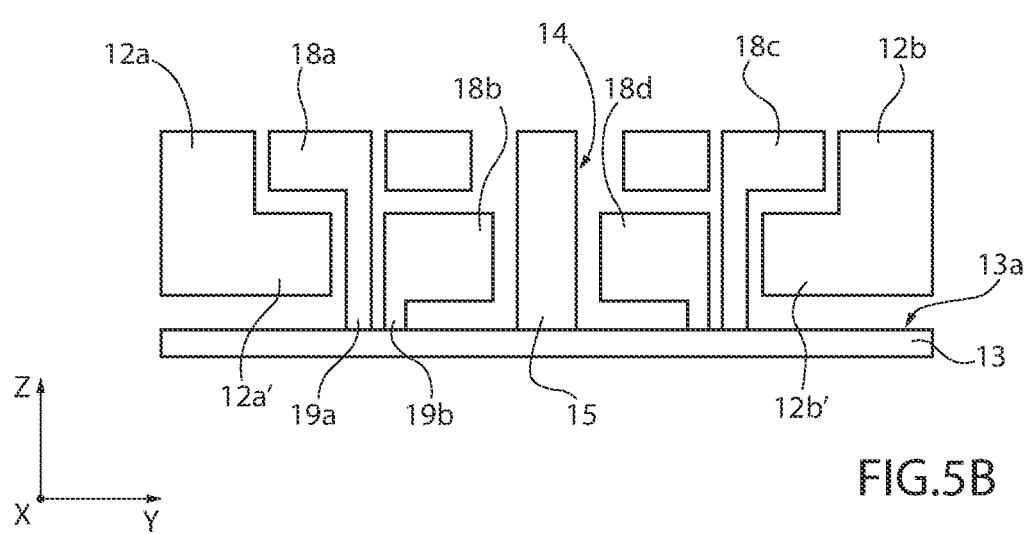

With reference to FIGS. 5A and 5B a further embodiment of the present solution is now described, capable of effectively rejecting even second-order spurious effects due to deformations of the substrate 13 and also spurious vibrational modes of the structure.

In this embodiment, the detection structure, once again designated by 10, comprises two pairs of stator electrodes, capacitively coupled in a differential manner to the inertial mass 12, on opposite sides with respect to the rotor anchor 15, respectively to the first and the second halves 12a, 12b of the inertial mass 12.

In each pair, the stator electrodes are arranged one above and the other below a respective reduced thickness portion of the inertial mass 12, as discussed in detail previously.

In this case, the first and the second stator electrodes 18a, 18b form a first pair of electrodes, capacitively coupled in a differential manner to the first half 12a of the inertial mass 12 at a respective reduced thickness portion 12a'. In the example, the first stator electrode 18a is arranged above the corresponding reduced thickness portion 12a', and the second stator electrode 18b is arranged below the corresponding reduced thickness portion 12a' of the first half 12a of the inertial mass 12.

The detection structure 10 further comprises a third and fourth stator electrodes 18c, 18d, which form a second pair of stator electrodes, capacitively coupled in a differential manner to the second half 12b of the inertial mass 12.

In a similar way to what has been described previously, also the third and the fourth stator electrodes 18c, 18d are arranged suspended above the substrate 13, to which they are integrally coupled by a respective third and a fourth stator anchors 19c, 19d, constituted by a column or pillar structure integral to the substrate.

In the example, the third stator electrode 18c is arranged above the corresponding reduced thickness portion 12b', and the fourth stator electrode 18d is arranged below the corresponding reduced thickness portion 12b' of the second half 12b of the inertial mass 12.

In this embodiment, the aforesaid stator electrodes 18a-18d have a substantially rectangular shape in plan view, elongated along the first horizontal axis x. Furthermore, in this case, the rotor anchor 15 and the stator anchors 19a-19d are aligned along the second horizontal axis y, once again arranged in mutual proximity.

The detection structure 10 has also in this case a configuration substantially symmetrical with respect to the first and the second horizontal axes x, y (i.e., the rotor anchor 15 defines a center of symmetry for the detection structure 10).

The operating principle of the detection structure 10 does not vary substantially with respect to what has been discussed previously. Advantageously, the presence of the two pairs of stator electrodes arranged on opposite sides to the rotor anchor 15 enables, by a double-differential configuration, rejection also of undesired second-order effects due to the deformation of the substrate 13.

Figure 6A:
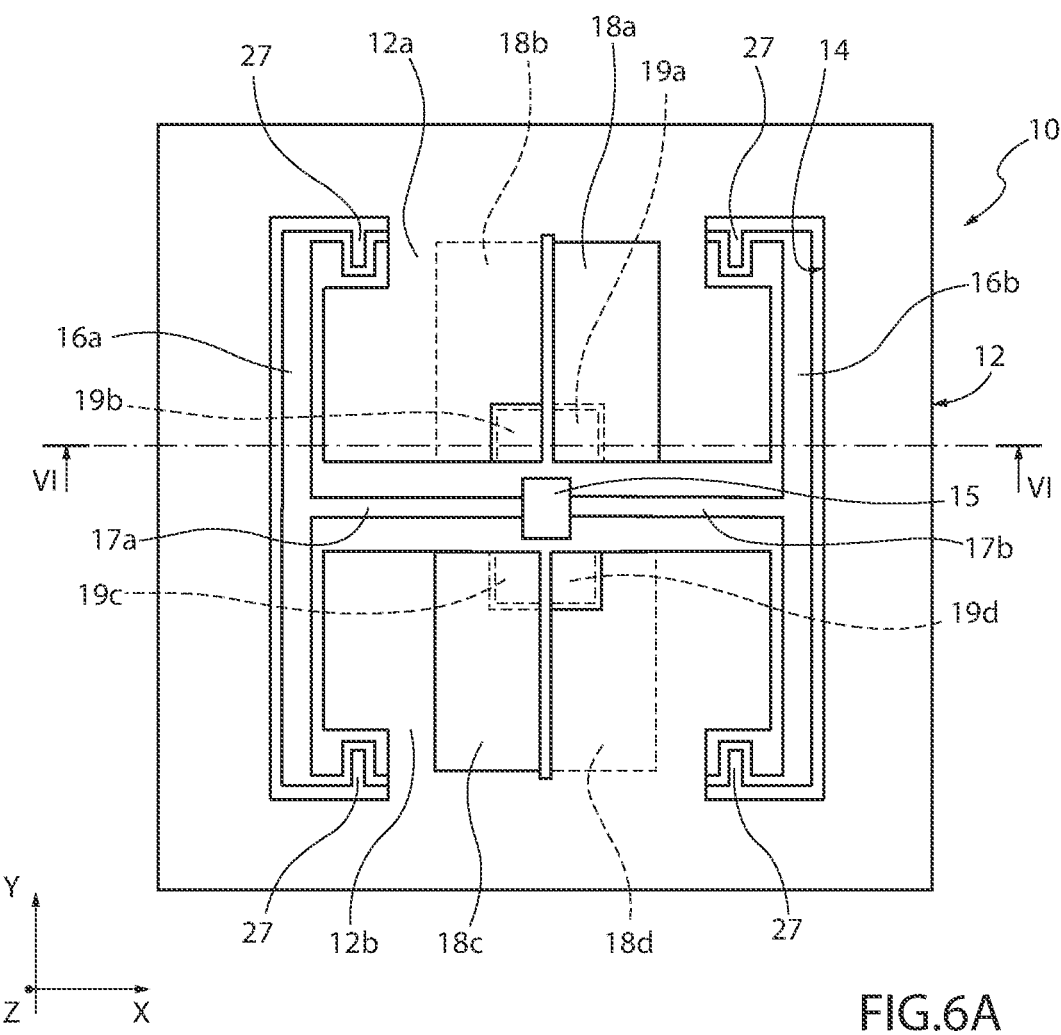
FIGS. 6A and 6B are, respectively, a top view and a schematic cross-sectional view along line VI-VI of a further variant of the detection structure along line VI-VI.
Figure 6B:
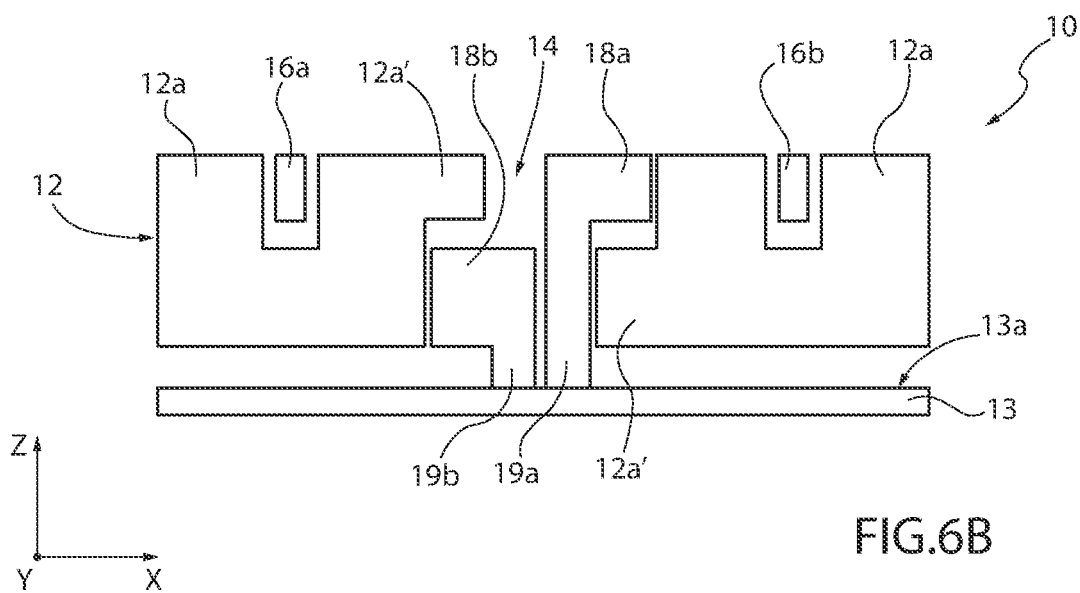

FIGS. 6A and 6B illustrate yet a further embodiment of the present solution, also in this case capable of effectively rejecting second-order spurious effects.

This embodiment differs from the one described in relation to FIGS. 5A and 5B substantially in that the stator electrodes 18a-18d, having in this case a substantially rectangular shape elongated along the second horizontal axis y, are set alongside one another along the first horizontal axis x. Consequently, the first and the second stator anchors 19a, 19b and, accordingly, the third and the fourth stator anchors 19c, 19d are here aligned in pairs along the first horizontal axis x.

The stator anchors 19a-19d are therefore arranged in a crosswise position around (or with central symmetry with respect to) the rotor anchor 15, with a consequent possibility of arranging the same anchors at an even smaller mutual distance apart, centrally to the footprint of the detection structure 10.

The above embodiment can therefore allow to obtain an even greater insensitivity to stresses and to the resulting deformations of the substrate 13.

Figure 7:
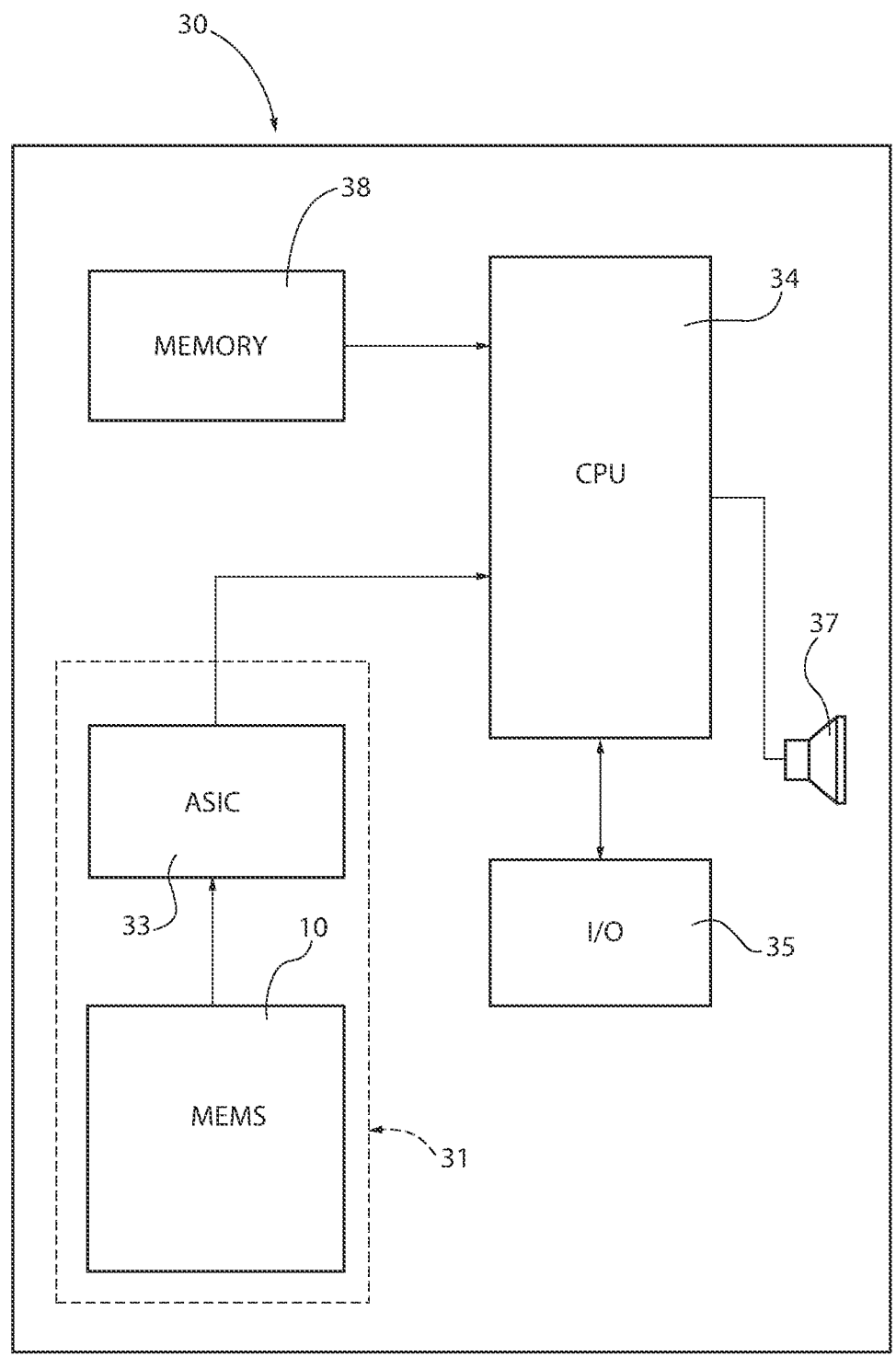
FIG. 7 is a general block diagram of an electronic apparatus incorporating a MEMS sensor device according to a further aspect of the present solution.

FIG. 7 moreover shows an electronic apparatus 30, in which the vertical-axis microelectromechanical acceleration sensor device, here designated by 31, may be used.

The microelectromechanical sensor device 31 includes, in addition to the aforesaid detection structure 10, an ASIC circuit 33 that provides the relative reading interface (and that may be provided in the same die as the one in which the detection structure 10 is made, or in a different die, which may in any case be housed in the same package).

The electronic apparatus 30 is, for example, a portable mobile communication apparatus, such as a mobile phone, a PDA (Personal Digital Assistant), a portable computer, but also a digital audio player with voice-recording capacity, a photographic or video camera, a controller for video games, etc.; the electronic apparatus 30 is generally able to process, store, and/or transmit and receive signals and information.

The electronic apparatus 30 comprises a microprocessor (CPU) 34, which receives the acceleration signals detected by the microelectromechanical sensor device 31, and an input/output (I/O) interface 35, for example, provided with a keypad and a display, connected to the microprocessor 34. Furthermore, the electronic apparatus 30 may comprise a speaker 37, for generating sounds on an audio output (not shown), and an internal memory 38.

The advantages of the microelectromechanical sensor device according to the present solution emerge clearly from the foregoing description.

In any case, it is once again emphasized that the present solution allows to substantially eliminate any drift of the electrical performance of the detection structure 10, due to the deformations of the substrate 13, on account of external stresses and stimuli, for example, on account of variations of temperature or of mechanical stresses, for example, deriving from soldering to a printed-circuit board or to causes of some other nature (such as ageing or absorption of humidity).

The detection structure 10 is thereby extremely stable, independently of the conditions of use and assembly in the corresponding package.

Finally, it is clear that modifications and variations may be made to what has been described and illustrated herein, without thereby departing from the scope of the present disclosure.

In particular, the solution described can find application in uniaxial sensors, but also in biaxial or triaxial sensors capable of detecting accelerations (or different quantities) also along the first horizontal axis x and/or along the second horizontal axis y (these sensors being provided for the purpose with further mobile and fixed structures and electrodes, arranged in an appropriate manner).

Furthermore, in general, the present solution can find application also in different types of MEMS sensor devices in which detection of a capacitive variation is required.

A microelectromechanical sensor device having a detection structure (10) may be summarized as including a substrate (13), having a top surface (13a); an inertial mass (12), suspended above the top surface (13a) of the substrate (13) and elastically coupled to a rotor anchor (15) so as to perform an inertial movement relative to said substrate (13) as a function of a quantity to be detected; and stator electrodes (18a, 18b), integrally coupled to the substrate (13) at respective stator anchors (19a, 19b) and capacitively coupled to said inertial mass (12) so as to generate a differential capacitive variation in response to, and indicative of, said quantity to be detected, characterized by said inertial mass (12) being configured to perform, as said inertial movement, a translation movement along a vertical axis (z) orthogonal to the top surface (13a) of said substrate (13); and by said stator electrodes (18a, 18b) being arranged in a suspended manner above the top surface (13a) of said substrate (13).

Said stator electrodes may include at least one first stator electrode (18a) and one second stator electrode (18b)

arranged facing the inertial mass (12), at a certain distance of separation (g), on opposite sides with respect to the vertical axis (z).

Said first and second stator electrodes (18a, 18b) may be suspended in a cantilever fashion above said top surface (13a) of the substrate (13) starting from a respective first and second stator anchor (19a, 19b) constituted by a column or pillar structure integral to the substrate (13).

The first stator electrode (18a) and the second stator electrode (18b) may be arranged above and, respectively, below a respective reduced thickness portion (12a', 12b') of the inertial mass (12).

The first stator electrode (18a) may be provided in a second structural layer (10") of the detection structure (10) arranged at a higher level, with the facing reduced thickness portion (12a', 12b') of the inertial mass (12) provided in a first structural layer (10') of the detection structure (10), arranged at a lower level with respect to the substrate (13); and the second stator electrode (18b) may be provided in the first structural layer (10'), with the respective facing reduced thickness portion (12a', 12b') of the inertial mass (12) provided in the second structural layer (10") of the detection structure (10).

Said first and second structural layers (10', 10") may be epitaxial-silicon layers grown on the top surface (13a) of said substrate (13), at least partially electrically and/or mechanically uncoupled from one another.

Said inertial mass (12) internally may define a window (14) that divides it into a first and into a second half (12a, 12b) with substantially symmetrical distribution of mass with respect to the rotor anchorage (15); wherein said first stator electrode (18a) may be capacitively coupled to the first half (12a) and said second stator electrode (18b) may be capacitively coupled to the second half (18b) of said inertial mass (12).

Said inertial mass (12) internally may define a window (14) that divides it into a first and into a second half (12a, 12b) with substantially symmetrical distribution of mass with respect to the rotor anchorage (15); wherein said first and second stator electrodes (18a, 18b) may be capacitively coupled to the first half (12a) of said inertial mass (12) and form a first differential pair of electrodes; and said stator electrodes may further include a third stator electrode (18c) and a fourth stator electrode (18d) arranged facing the second half (12b) of the inertial mass (12), on opposite sides with respect to the vertical axis (z) and forming a second differential pair of electrodes.

Said stator electrodes (18a-18d) may have respective stator anchors (19a-19d); and said stator anchors and said rotor anchor (15) may be arranged in mutual proximity, centrally with respect to said detection structure (10), said rotor anchor (15) defining a center of symmetry for said detection structure (10).

Said stator anchors (19a-19d) may be arranged about said rotor anchor (15), in a way symmetrical with respect to said center of symmetry.

Said stator anchors (19a, 19b) may be aligned to said rotor anchor (15) along a horizontal axis (x, y) of a horizontal plane (xy) to which said top surface (13a) of the substrate is parallel.

Said inertial mass (12) may be elastically coupled to the rotor anchor (15) by elastic elements (16a, 16b), compliant to bending along the vertical axis (z).

Said elastic elements (16a, 16b) may have a longitudinal extension along a horizontal axis of a horizontal plane (xy), to which said top surface (13a) of the substrate is parallel, and may be coupled to said rotor anchor (15) by connection elements (17a, 17b) having an extension along a further horizontal axis of the horizontal plane (xy), transverse to said horizontal axis.

Said detection structure (10) may implement a uniaxial accelerometer configured to detect an acceleration acting along said vertical axis (z).

The present disclosure is also directed to a device having a substrate, having a first surface; an anchor; an inertial mass, suspended above the first surface of the substrate and elastically coupled to the anchor; and a first stator electrode coupled to the substrate, the first stator electrode having a second surface that is spaced from the first surface of the substrate by a first distance, the second surface facing away from the substrate. The device includes a second stator electrode coupled to the substrate and spaced from the first stator electrode by the anchor, the second stator electrode having a third surface that is spaced from the first surface of the substrate by a second distance that is less than the first distance, the third surface facing away from the substrate.

The inertial mass includes a window having a first extension along a first direction, the anchor being within the first extension, a second extension along a second direction that is transverse to the first direction, and a third extension along the second direction and spaced from the second extension by the first extension. The first and second stator electrodes are suspended in a cantilever fashion above said first surface of the substrate from a pillar structure coupled to the substrate. The inertial mass includes a first step and a second step, the first step is aligned with the first stator electrode and the second step is aligned with the second stator electrode.

The disclosure is also directed to a suspended mass that includes: a first surface that is opposite to a second surface; a third surface that is between the first and second surfaces; and an opening. A central anchor coupled to the substrate and in the opening. A first electrode coupled to the substrate and configured to interact with the third surface of the suspended mass. A second electrode coupled to substrate and configured to interact with the third surface of the suspended mass. The first electrode includes a first surface facing away from the substrate and the second electrode includes a second surface facing away from the substrate, the second surface of the second electrode being closer to the substrate than the first surface of the first electrode. The first electrode includes a first dimension from the substrate to the first surface of the first electrode and the second electrode includes a second dimension from the substrate to the second surface of the second electrode, the second dimension being smaller than the first dimension.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a substrate, having a first surface;
an anchor on the substrate, the anchor having a first surface opposite the substrate along a first direction;
an inertial mass on the substrate, the inertial mass suspended above the first surface of the substrate and elastically coupled to the anchor with elastic elements, the inertial mass having a first reduced thickness portion with a first thickness along the first direction and a second reduced thickness portion with a second thickness along the first direction smaller than the first thickness;
a first stator electrode coupled to the substrate, the first stator electrode having a second surface that is spaced from the first surface of the substrate along the first direction by a first distance, the second surface facing away from the substrate and being coplanar with the first surface of the anchor, the first reduced thickness portion of the inertial mass being between the first stator electrode and the substrate along the first direction; and
a second stator electrode coupled to the substrate and spaced from the first stator electrode by the anchor along a second direction transverse to the first direction, the second stator electrode having a third surface that is spaced from the first surface of the substrate along the first direction by a second distance that is less than the first distance, the third surface facing away from the substrate, the second stator electrode being between the second reduced thickness portion and the substrate,
wherein the elastic elements have a longitudinal extension along a first horizontal axis of a horizontal plane, to which said first surface of the substrate is parallel, and are coupled to the anchor by connection elements having an extension along a second horizontal axis of the horizontal plane, transverse to the first horizontal axis,
wherein the elastic elements are compliant to bending along a vertical axis.

2. The device according to claim 1 wherein the inertial mass includes a window having a first extension along a first direction, the anchor being within the first extension, a second extension along a second direction that is transverse to the first direction, and a third extension along the second direction and spaced from the second extension by the first extension.

3. The device according to claim 2 wherein said first and second stator electrodes are suspended in a cantilever fashion above said first surface of the substrate from a pillar structure coupled to the substrate.

4. The device according to claim 2 wherein the first reduced thickness portion is aligned with the second stator electrode and the second reduced thickness portion is aligned with the first stator electrode.

5. The device according to claim 4 wherein the inertial mass is part of a first structural layer and the first stator electrode is part of a second structural layer, the second structural layer being spaced from the substrate further than the first structural layer, the second stator electrode is part of the first structural layer.

6. The device according to claim 5 wherein the first and second structural layers are epitaxial-silicon layers grown on the first surface of the substrate.

7. The device according to claim 2 wherein said inertial mass internally defines a window that forms a first and a second half with substantially symmetrical distribution of mass with respect to the anchor, the first stator electrode is capacitively coupled to the first half and the second stator electrode is capacitively coupled to the second half of the inertial mass.

8. A device, comprising:
a substrate;
a central anchor on the substrate having a first surface opposite the substrate along a first direction;
a suspended mass on the substrate and coupled to the central anchor with elastic elements, the suspended mass including a first surface opposite a second surface along the first direction, the first surface of the suspended mass being further from the substrate than the second surface of the suspended mass, the suspended mass including:
a first reduced thickness portion with a first face coplanar with the second surface of the suspended mass and having a first thickness along the first direction; and
a second reduced thickness portion with a second face coplanar with the first surface of the suspended mass and the first surface of the central anchor and having a second thickness smaller than the first thickness along the first direction;
a first electrode between the central anchor and the suspended mass along a second direction transverse to the first direction, the first electrode having a third surface that is coplanar with the first surface of the suspended mass and the first surface of the central anchor, the first electrode being coupled to the substrate, the first reduced thickness portion being between the first electrode and the substrate along the first direction;
a second electrode between the central anchor and the suspended mass along the second direction, the second electrode spaced from the first electrode by the central anchor, the second electrode being coupled to the substrate, the second electrode being between the second reduced thickness portion and the substrate along the first direction; and
connection elements coupled between the central anchor and the elastic elements, the elastic elements extending along the second direction, the connection elements extending along a third direction transverse to both the first and second directions,
wherein the elastic elements enable a translation of the suspended mass along the first direction and minimize a translation of the inertial mass along the second and third directions.

9. A device, comprising:
a substrate;
an anchor on the substrate having a first surface opposite the substrate along a first direction;
an inertial mass coupled to the anchor with an elastic element and suspended above the substrate, the inertial mass having a first side opposite a second side, the second side being closer to the substrate than the first side along the first direction, the first side being coplanar with the first surface of the anchor, the inertial mass including:
a first reduced thickness portion with a first surface coplanar with the second side and having a first thickness along the first direction; and a second reduced thickness portion with a first surface coplanar with the first side and having a second thickness along the first direction smaller than the first thickness;

a first electrode between the anchor and the inertial mass along a second direction transverse to the first direction, the first electrode having a first segment with a first surface that is coplanar with the first side of the inertial mass and the first surface of the second reduced thickness portion and the first surface of the anchor, the first reduced thickness portion of the inertial mass being between the first segment and the substrate; and a second electrode between the anchor and the inertial mass along the second direction, the second electrode having a second segment with a first surface that is coplanar with the second side of the inertial mass and the first surface of the first reduced thickness portion, the second segment being between the second reduced thickness portion of the inertial mass and the substrate; and a connection element coupled between the anchor and the elastic element, the elastic element extending along the second direction, the connection element extending along a third direction transverse to both the first and second directions, wherein the elastic element enables a translation of the inertial mass along the first direction and minimizes a translation of the inertial mass along the second and third directions.

10. The device of claim 9 wherein the elastic element is substantially parallel to the substrate and the connection element are substantially parallel to the substrate.

11. The device of claim 9 wherein the first segment of the first electrode is separated from the first reduced thickness portion of the inertial mass by a first distance and the second segment of the second electrode is separated from the second reduced thickness portion of the inertial mass by the first distance.

12. The device of claim 9 wherein the inertial mass has a first layer and a second layer.

13. The device of claim 9 wherein the first segment of the first electrode has a first thickness along the first direction that is smaller than a second thickness of the second segment of the second electrode.

* * * * *